Jan. 1, 1957 — R. G. THOMPSON — 2,776,337
FACSIMILE FILM-COPYING APPARATUS
Filed Nov. 29, 1950 — 3 Sheets-Sheet 1
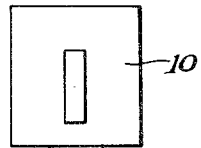
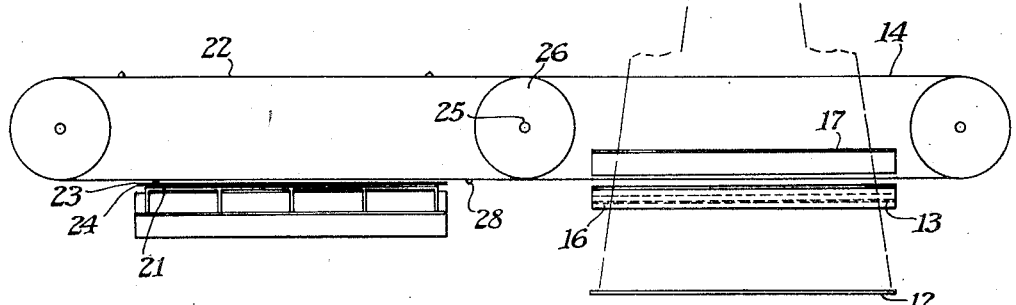
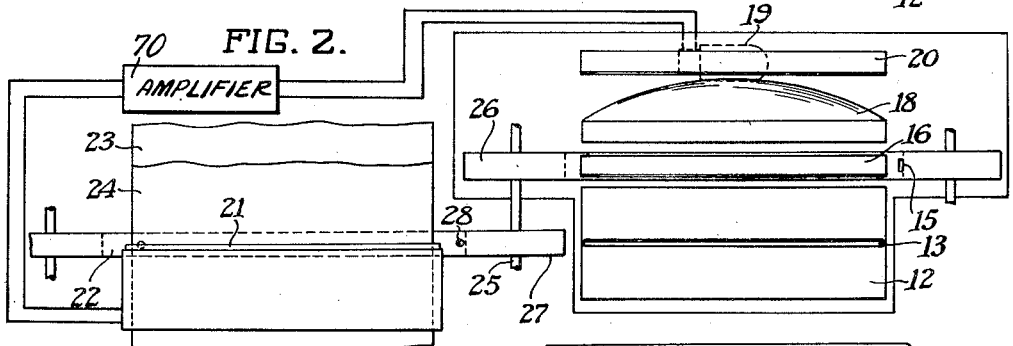
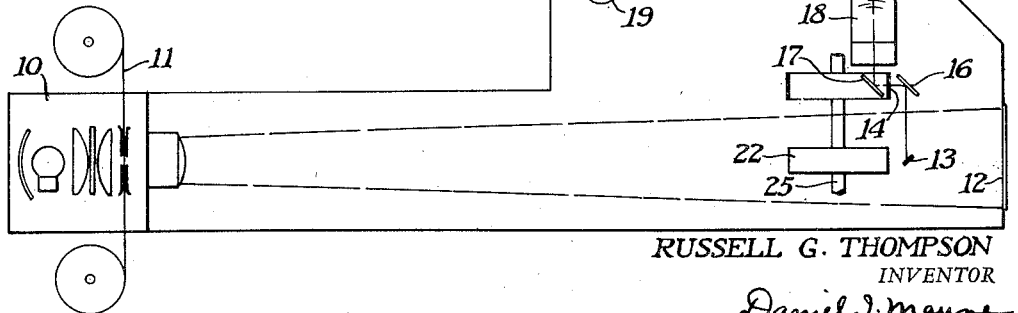
RUSSELL G. THOMPSON
INVENTOR
BY Daniel J. Mayne
Frank R. Gollon
ATTORNEYS

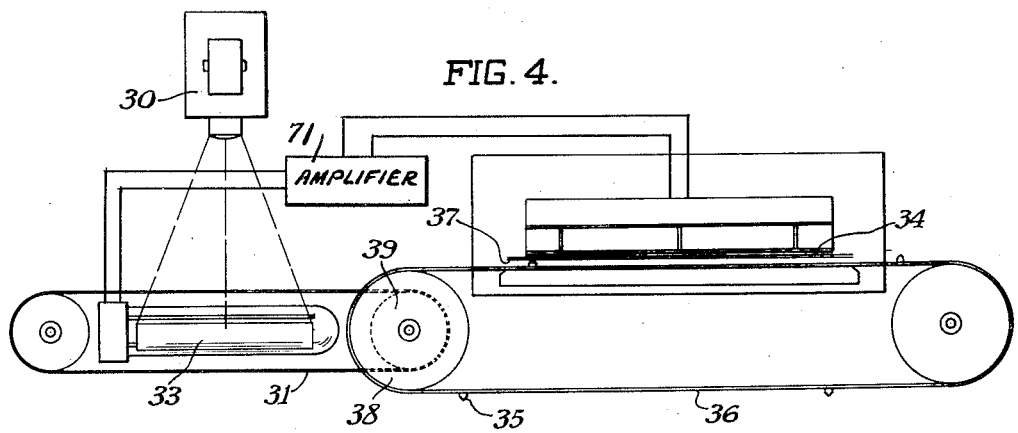
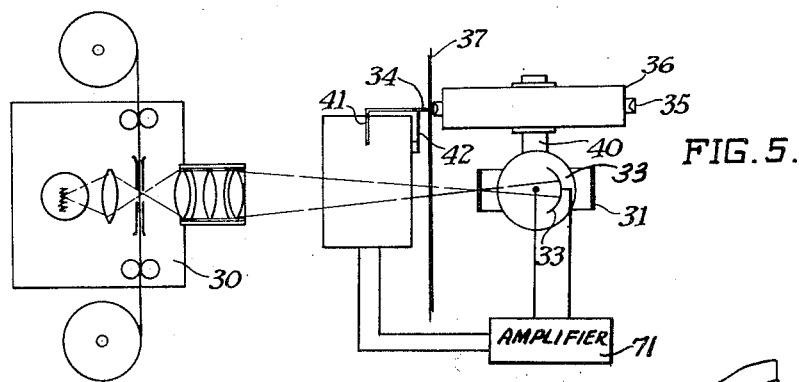
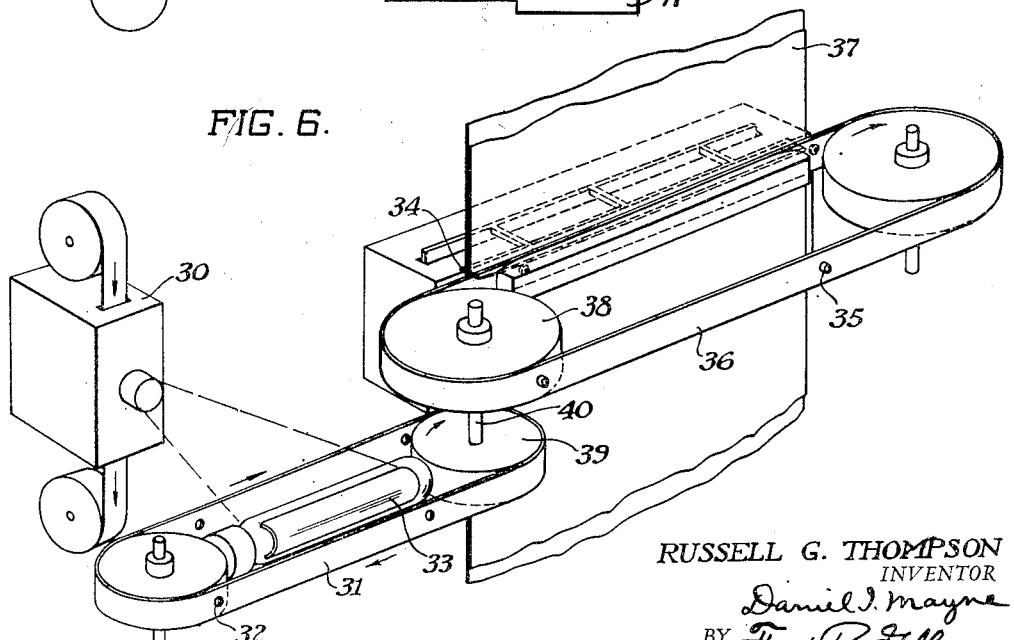

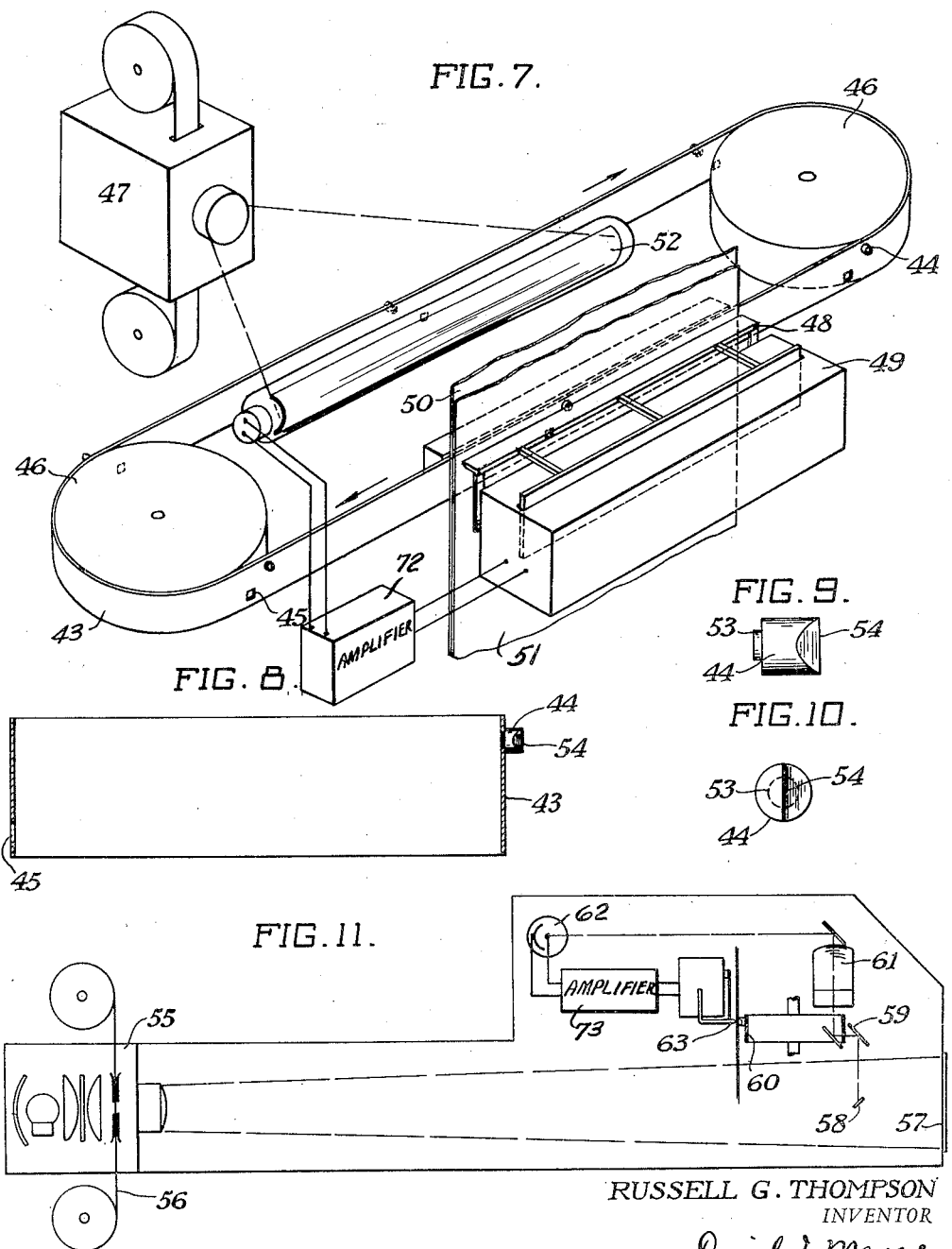

United States Patent Office 2,776,337
Patented Jan. 1, 1957

2,776,337
FACSIMILE FILM-COPYING APPARATUS

Russell G. Thompson, Rochester, N. Y., assignor to Eastman Kodak Company, Rochester, N. Y., a corporation of New Jersey Application November 29, 1950, Serial No. 198,090

19 Claims. (Cl. 178—6.6)

This invention relates to the art of facsimile reproduction and more particularly to a facsimile apparatus for copying film by scanning the projected image thereof.

It has been found to be very desirable to photograph records, drawings, etc. upon microfilm for storage purposes since a considerable saving of storage space is obtained by keeping the microfilm copies rather than the original records, drawings, etc. Devices are now in use for projecting enlarged images from such films for reading the material contained thereon and apparatus is now available for producing enlarged copies or prints of the individual microfilms which are comparable in size to the originals from which the microfilms have been made, when these may be required. However, photographic means are ordinarily employed to produce such enlarged copies, which are much like the photographic enlargers which are used for making enlarged photographic prints from smaller negatives. The disadvantages inherent in the use of such apparatus are quite apparent. The cost of making enlargements by a photographic process is relatively large as compared with prints of a like size made upon an unsensitized paper by a facsimile process. Prints made by a photographic process also require treatment to develop the latent image. Development is not required where the prints are produced by a carbon paper type of facsimile recording. This invention is directed, therefore, to the use of a facsimile apparatus for copying pictures or intelligence which are on film and especially to making enlarged reproductions of such pictures or intelligence from copy on microfilm.

Because of the minute size of the image on microfilm, I have found it advantageous to scan the enlarged projected image from the film rather than the film itself. By the novel construction and arrangement of parts of my apparatus, it is also possible for the operator to have a relatively unobstructed and legible view of the picture or intelligence which is being scanned at the same time that the facsimile reproduction is being produced. This permits the apparatus described herein to function both as a microfilm reader and as a facsimile copying device. I have found that an apertured scanning belt is well adapted for use as the scanning mechanism in my apparatus, the elements of light traversing the belt aperture or apertures being permitted to fall upon an elongated phototube which is coextensive with the effective scanning length of the belt. But preferably, the elements of light traversing the scanning aperture or apertures are all caused to be focused by a large converging aspheric lens upon a smaller electron multiplier, which arrangement has certain advantages in respect to improved uniformity and definition of the reproduction, generally improved performance of the apparatus, and lower cost.

For the recording unit I employ a stylus belt which cooperates with a magnetically-actuated printing bar, which unit is itself well known in the facsimile art. A further feature of this invention is the mounting of the pulleys or sprockets about which the apertured and stylus belts travel upon a single drive shaft. This will insure exact synchronization and phasing at all times independent of the operation of any motors which may be used to drive the belts or of fluctuations in the frequency of the power lines which energize the scanning and recording units. Moreover, by using pulleys of different diameters and making the two belts of proportionately different lengths, it is possible to scan an image of one size and print a reproduction of a proportionately different size. As an alternative, I also disclose a single belt having both scanning aperture or apertures and printing stylus or styli thereon to perform both operations, i. e., scanning the projected image of the copy and cooperating with the printing bar to produce the facsimile reproduction. Such a device also obviously results in unvarying and exact synchronization and phasing at all times.

It is, therefore, an object of this invention to provide a new and improved facsimile apparatus for copying film.

It is a further object of this invention to provide an apparatus of the character described wherein the projected image of a moving film may be scanned and simultaneously viewed upon a projection screen.

It is a still further object of this invention to provide a new and improved facsimile apparatus in which both the aperture and stylus belts travel about sprockets which are mounted upon a single drive shaft to maintain the belts in constant synchronism and phase.

It is a still further object of this invention to provide a new and improved facsimile apparatus in which a single belt is employed having both one or more scanning apertures therein and a corresponding number of printing styli thereon.

Other objects and advantages of the invention will become apparent from the following description taken in connection with the accompanying drawings, and it will be understood that many changes may be made in the details of construction and arrangement of parts shown and described without departing from the spirit of the invention as expressed in the accompanying claims. I, therefore, do not wish to be limited to the exact details shown and described as the preferred forms only have been shown by way of illustration.

In the drawings:

Fig. 1 is a plan view of a portion of a combined microfilm reader and facsimile copying apparatus embodying certain features of the present invention;

Fig. 2 is a front elevation of the same apparatus;

Fig. 3 is a side elevation, partly in section, of the same apparatus;

Fig. 4 is a plan view of a film scanning and recording apparatus embodying another feature of the present invention;

Fig. 5 is an elevational view, partly in section, of the same apparatus shown in Fig. 4;

Fig. 6 is a perspective view illustrating the apparatus of Figs. 4 and 5;

Fig. 7 is a perspective view of a modified film scanning and recording apparatus embodying still another feature of the present invention;

Fig. 8 is an enlarged sectional view of the combined scanning and recording belt shown in Fig. 7;

Fig. 9 is an enlarged side elevation illustrating the construction of the printing stylus used on the several printing belts employed in each of the several facsimile recording units herein described;

Fig. 10 is a front elevation of the same printing stylus; and

Fig. 11 is a side elevation, partly in section, of a modified combination microfilm reader and facsimile copying apparatus employing a single belt which both scans the projected image and cooperates with the printing bar to print the facsimile reproduction.

In the apparatus illustrated in Figs. 1 to 3 the projector 10 projects an image of the film 11 upon a translucent viewing screen 12. The film 11 may be what is conventionally known as microfilm upon which are reduced photographic images of records, drawings or any other intelligence which have been produced photographically from the original copy. This film is caused to be moved continuously through the projector at a rate of speed which will permit the complete scanning of the picture or intelligence on the film which is to be reproduced, as will be further described below. A relatively narrow and elongated optical element 13 is positioned in the projected beam to intercept and deflect a transverse elemental area of the beam upwardly and out of the path of the beam to a position where it may be scanned without obstructing the projection of the image upon the screen 12. The scanning unit comprises a belt 14 which has therein one or more scanning apertures 15, the travel of which causes the transverse elemental area to be scanned from end to end. Reflector 16 is provided to deflect the upwardly deflected transverse elemental area into the plane of the scanning belt. Reflector 17 is positioned on the other side of the belt to receive all that light from the transverse elemental area of the projected image which passes through the scanning aperture of the belt 14, such light being reflected upwardly through a large converging aspheric lens 18 which focuses it upon an electron multiplier or other photoelectric device 19. The reflector 20 is interposed between the lens 18 and the photoelectric device 19 in order to bend the light rays so that the complete apparatus may be made more compact. The screen 12, of course, will lie in the focal plane of the projector 10 and, in order that the scanning belt 14 may scan a sharp image, the belt should similarly be positioned in the focal plane of the deflected transverse elemental area of the projected beam. The sum of the distances from the belt 14 to the reflector 16 and from the reflector 16 to the optical element 13 is made equal to the distance from the optical element 13 to the screen 12 in order that the transverse elemental area of the beam will focus upon the scanning belt 14.

Signals which are generated by the photoelectric device are suitably amplified by amplifier 70 to actuate a magnetically-driven printing bar 21 which is adapted to strike against a stylus 28 carried by the stylus belt 22 in response to the photoelectric signals. By passing a superposed blank paper 23 and carbon paper 24 between the stylus belt 22 and the printing bar 21, the repeated striking of a stylus by the bar will produce elemental markings upon the paper 23 corresponding to those elements of the projected image. The superposed papers are driven past the printing bar at a rate of speed corresponding to that of the copy, or rather the image thereof, being scanned. The recorder belt 22 may have mounted thereon one or more styli, the scanning belt 14 having a corresponding number of apertures. A feature of the disclosed apparatus is that the scanning and recording belts are mounted respectively upon the pulleys or sprockets 26 and 27 which are both secured upon the shaft 25, whereby the two belts will travel in constant synchronism and phase. Although not illustrated, the belts 14 and 22 are preferably provided with marginal perforations which mesh with teeth formed on the sprockets 26 and 27 to be positively engaged by the latter.

Although I disclose as the preferred form the recording unit described above, it will be apparent that I may employ instead such other well-known recording mechanisms as a drum having a raised helical rib thereon and a printing bar or, as a matter of fact, any other known recording means operating on some other principle than that using carbon paper as, for example, ink recording or electrolytic recording. Although the scanning unit described in connection with the disclosed film-copying apparatus comprises an apertured belt, it is apparent that other devices, such as an apertured scanning disc or an apertured scanning cylinder, both of which are known to those skilled in the facsimile art, may be employed in the described apparatus. By the rotation of such an apertured disc or cylinder, the copy, or rather the image thereof, may be scanned line-by-line in a manner similar to the line-by-line scanning of the belt 14. Whatever form the scanning and recording units may take, it is contemplated that these shall be driven from a single drive shaft and so interconnected that the two will remain in constant synchronism and phase.

The film 11 is preferably moved continuously through the projector at such a rate of speed that the film is advanced a distance equal to the width of the elemental area, which is projected as the transverse elemental area to be scanned, in the time which elapses between successive starts of the scanning of each transverse line or area. In this manner the complete copy imaged upon the film will be scanned by the apparatus. As an alternative, the film may be advanced intermittently through the projector, the transverse elemental area being scanned after the film has come to rest and the film then advancing the width of an elemental area in the interval that the scanning aperture is not scanning but coming up to its position at the beginning of a scanning operation. This, of course, will require that the scanning apertures be properly spaced upon the belt to provide intermittent nonscanning intervals, or, where a single aperture is employed, that the belt be of adequate length to similarly provide such nonscanning intervals.

In Figs. 4 to 6 I disclose a further feature of my invention which is adapted to produce facsimile reproductions of a size different from the projected image being scanned. This is accomplished by making the scanning and recording belts of different lengths, the drive pulleys or sprockets therefor being of proportionately different diameters so that the belts travel in constant synchronism although at different linear velocities. Although such belts of different lengths may be employed in the apparatus of Figs. 1 to 3, I disclose the use of these in Figs. 4 to 6 in a simplified facsimile film-copying apparatus in which there is no provision for the simultaneous viewing of the projected image of the copy while the latter is being scanned. In Figs. 4 to 6 the projector 30 projects an enlarged image of the film image in a focal plane in which the scanning belt 31 is adapted to be driven, the scanning belt having one or more apertures 32 therein. Immediately behind the belt 31 is positioned an elongated phototube 33 or other photoelectric device of a length sufficient to receive any and all light from the projected image which passes through the scanning aperture. Signals generated by the photoelectric device are suitably amplified to operate the magnetically-driven printing bar 34 which cooperates with the stylus or styli 35 carried by the recording belt 36 to produce a carbon paper recording on the blank sheet 37 in the same manner as the recording unit of the apparatus of Figs. 1 to 3 functions. The recording belt 36 is of a greater length than the scanning belt 31 and the pulleys or sprockets 38 and 39, about which the two belts travel, have proportionately different diameters whereby the two belts will move in synchronism although at different linear speeds. Where a plurality of scanning apertures 32 and recording styli 35 are employed, the latter are spaced a correspondingly greater distance apart than are the scanning apertures. In this manner a recording stylus will scan a full line for reproduction purposes while the scanning aperture scans the corresponding line of copy image and the facsimile reproduction will be of a larger size than the projected image which is being scanned. As in the corresponding elements in the apparatus of Figs. 1 to 3, the sprockets 38 and 39 are connected by the shaft 40 so that the two belts 31 and 36 are positively interconnected and will, therefore, remain in constant synchronism and phase. Although not illustrated, the belts 31 and 36 are preferably provided with marginal perforations which mesh with teeth formed on the sprockets 39 and 38.

The magnetically-driven printing bar unit, which is employed in this as well as in the other forms of my invention, herein described, is of conventional construction and no claim is made to this unit per se. It comprises an armature 41 to which is rigidly secured the printing bar 34, the armature being vibrated by electromagnetic coils (not shown) which are energized by the signals generated by and received from the photoelectric device of the scanning unit, such signals being first amplified by amplifier 71 in the conventional manner. A leaf spring 42, secured at one end to the printing bar, functions to normally retain the printing bar in retracted position when no signal is being received and also to guide the movement of the printing bar to preclude any transverse motion of this bar as it is driven against a belt stylus in response to a signal.

Fig. 7 illustrates a further modification of my invention in which a single belt is employed for both scanning the projected image and cooperating with the printing bar to reproduce the image on paper. The belt 43, provided with both recording stylus or styli 44 and scanning aperture or apertures 45, travels about the sprockets 46 and is adapted to scan the image projected by projector 47 along one section of its path of travel and to simultaneously coact with the magnetically-driven printing bar 48 along another section of its path to reproduce the image. The magnetically-operated printing unit 49 is constructed as previously described, the superposed blank paper 50 and carbon paper 51 passing between the printing bar and belt, as illustrated. The photoelectric device comprises an elongated phototube 52 having a length consistent with the length of the transverse elemental area of the image being scanned, signals therefrom after suitable amplification by amplifier 72 actuating the printing unit 49. By forming both the recording styli and scanning apertures on a single belt, it will be apparent that the recording and scanning units are at all times in exact synchronism and phase. Fig. 8 illustrates the manner in which the belt is provided with both apertures and styli. The latter are preferably formed of small cylindrical elements, each having one end provided with a stud 53, which is adapted to be fastened in a hole formed in the belt, the other end being ground down or otherwise formed to present an edge 54 to the printing bar of a width corresponding to the size of the elemental marking to be produced by the impact of the printing bar. The construction of the stylus element is shown in Figs. 9 and 10.

Such a combined scanning and recording belt, as I have illustrated in Fig. 7, could readily be substituted for the separate scanning and recording belts described in connection with the apparatus of Figs. 1 to 3, and I illustrate such a modified apparatus in Fig. 11. In this apparatus the projector 55 projects an image from the moving film 56 upon the translucent viewing screen 57. A transverse elemental area of the beam is intercepted by the optical element 58 and reflected upwardly to the reflector 59 which directs the transverse elemental area upon the belt 60. This belt is similar to that disclosed in Fig. 7 in that it is provided with both an aperture or apertures and a corresponding number of recording styli. All the light which traverses the scanning aperture in belt 60 is reflected upwardly and focused by the converging lens 61 upon the photoelectric device 62. Signals generated by the latter, suitably amplified by amplifier 73, actuate the magnetically-driven printing bar 63 which is adapted to strike against the stylus on belt 60 in response to the signals generated by the photoelectric device.

It should be understood that, while I disclose the use of a converging lens in both the apparatus illustrated in Figs. 1 to 3 and in Fig. 11 to focus each element of light, which traverses the belt aperture as it scans the complete length of the transverse elemental area of the projected beam, upon the electron multiplier or other photoelectric device, I may omit such optical means, including the converging lens, and substitute therefor an elongated phototube, such as I have shown in Figs. 6 and 7. Similarly, I may omit the elongated phototube in the apparatus illustrated in Figs. 6 and 7 and use in its stead a converging optical system to focus all the light traversing the scanning aperture upon a smaller, more compact photoelectric device, which I have found offers certain advantages in respect to improved uniformity and definition of the reproduction and generally improved performance.

From the foregoing description, it will be apparent that I have provided means for obtaining all the objects and advantages of this invention.

What I claim and desire to secure by Letters Patent of the United States is:

1. A facsimile film-copying apparatus comprising a projector adapted to project an image from a moving film band, a translucent screen adapted to receive the projected image, means interposed in the projected beam adapted to intercept and deflect a transverse elemental area of the projected beam, an apertured scanning device adapted to scan the deflected elemental area of the beam, a photoelectric device adapted to receive the light which traverses the scanning device, and a recording mechanism operating upon signals received from said photoelectric device to produce a copy of said projected image.

2. A facsimile apparatus for scanning images projected from film comprising a projector adapted to project an image from a moving film band, a translucent screen adapted to receive the projected image, means interposed in the projected beam adapted to intercept and deflect a transverse elemental area of the beam, an apertured scanning device positioned to scan the deflected elemental area of the beam, and a photoelectric device adapted to receive those portions of the deflected elemental area of the beam which traverse the apertured scanning device.

3. A facsimile film-copying apparatus comprising a projector having means for moving an image-bearing film and an optical system for projecting the film image in a focal plane, a viewing screen located in said plane, means interposed between the projector and the screen to intercept and deflect a transverse elemental area of the projected image into a second focal plane, a device for scanning the transverse elemental area in the second focal plane, and a recording mechanism operating upon signals received from the scanning device to produce a copy of the projected image.

4. A facsimile apparatus for scanning images projected from film comprising a projector having means for moving an image-bearing film and an optical system for projecting the film image in a focal plane, a viewing screen located in said plane, means interposed between the projector and the screen to intercept and deflect a transverse elemental area of the projected image into a second focal plane, and a device for scanning the transverse elemental area in said second focal plane.

5. A facsimile apparatus for scanning images projected from film comprising a projector having means for moving an image-bearing film and an optical system for projecting the film image in a focal plane, a viewing screen located in said plane, a relatively narrow and elongated optical element interposed between the projector and the screen to intercept and deflect a transverse elemental area of the projected image into a second focal plane, an apertured scanning element in said second focal plane for scanning the transverse elemental area of the projected image, and a photoelectric device adapted to receive that light from the transverse elemental area of the projected image which traverses the apertured scanning element.

6. A facsimile apparatus for scanning images projected from film comprising a projector having means for moving an image-bearing film and an optical system for projecting the film image in a focal plane, a translucent screen positioned in said plane, optical means comprising a relatively narrow and elongated mirror interposed between the projector and the screen to intercept and deflect a transverse elemental area of the projected image into a second focal plane, a driven apertured belt adapted to scan the transverse elemental area in said second plane, and a photoelectric device positioned to receive that light from the transverse elemental area of the projected image which traverses the apertured belt.

7. A facsimile apparatus for scanning images projected from film comprising a projector having means for moving an image-bearing film and an optical system for projecting the image in a focal plane, a translucent viewing screen positioned in said plane, reflector means interposed between the projector and the screen to intercept a transverse elemental area of the projected image and to deflect said elemental area into a second focal plane, a driven, apertured belt adapted to scan the deflected elemental area in said second plane, a photoelectric device, and a converging lens adapted to direct upon the photoelectric device all that light from the transverse elemental area of the projected image which traverses the apertured scanning belt.

8. A facsimile film-copying apparatus comprising a projector having means for moving an image-bearing film and an optical system for projecting the image in a focal plane, a viewing screen located in said plane, optical means including a relatively narrow and elongated element interposed between the projector and the screen to intercept and deflect a transverse elemental area of the projected image into a second focal plane, a device for scanning the transverse elemental area in the second focal plane, a recording mechanism operating upon signals received from the scanning device to produce a copy of the projected image, and a single drive shaft adapted to drive both the scanning device and the recording mechanism whereby the two remain in constant synchronism.

9. A facsimile film-copying apparatus comprising a projector having means for moving an image-bearing film and an optical system for projecting the image in a focal plane, a viewing screen located in said plane, means interposed between the projector and the screen to intercept and deflect a transverse elemental area of the projected image into a second focal plane, an apertured scanning belt adapted to scan the transverse elemental area in said second plane, a photoelectric device adapted to receive that light from the transverse elemental area of the projected image which traverses the apertured belt, a printing belt having a stylus thereon adapted to produce a copy of the projected image in response to signals received from the photoelectric device, and a single drive shaft adapted to drive both the apertured and printing belts whereby the two remain in constant synchronism.

10. A facsimile film-copying apparatus comprising a projector having means for moving an image-bearing film and an optical system for projecting an image in a focal plane, an endless apertured belt, a plurality of pulleys supporting the belt, said belt being adapted to scan the projected image in said focal plane, a photoelectric device adapted to receive that light from the projected image which traverses the apertured belt, an endless printing belt having a stylus thereon adapted to produce a copy of the projected image in response to signals received from the photoelectric device, a plurality of pulleys supporting said printing belt, and a single driven shaft to which is secured an apertured-belt pulley and a printing-belt pulley whereby said shaft will function to drive both belts in constant synchronism.

11. A facsimile film-copying apparatus comprising a projector having means for moving an image-bearing film and an optical system for projecting an image in a focal plane, and endless belt, a plurality of pulleys adapted to support and drive said belt, a portion of the path of said belt being in the focal plane of the projected image, said belt having a scanning aperture and a recording stylus, a photoelectric device adapted to receive that light from the projected image which traverses the belt aperture as it moves in said focal plane, and means cooperating with said stylus responsive to signals received from the photoelectric device whereby a copy of the image scanned by the aperture is produced.

12. In a facsimile apparatus, a scanning device comprising a plurality of pulleys, means for driving at least one of said pulleys, an endless belt supported and adapted to be driven by said pulleys, said belt having an aperture and a stylus thereon, a photoelectric device adapted to receive that light from an image being scanned which traverses the belt aperture, and means cooperating with said stylus responsive to signals received from the photoelectric device whereby a copy of the image scanned by the aperture is produced.

13. A facsimile film-copying apparatus comprising a projector having means for moving an image-bearing film and an optical system for projecting the image in a focal plane, a viewing screen located in said plane, means interposed between the projector and the screen to intercept and deflect a transverse elemental area of the projected image into a second focal plane, a plurality of pulleys, means for driving at least one of said pulleys, an endless belt supported and adapted to be driven by said pulleys, said belt having a scanning aperture and a stylus thereon and being positioned to scan the transverse elemental area of the image in said second plane, a photoelectric device adapted to receive that light from the scanned image which traverses the belt aperture, and means cooperating with said belt stylus responsive to signals received from the photoelectric device whereby a copy of the image scanned by the aperture is produced.

14. In a facsimile apparatus, an endless apertured scanning belt, a plurality of pulleys adapted to support and drive said scanning belt, a photoelectric device adapted to receive that light from a scanned image which traverses the apertured belt, an endless printing belt having a stylus thereon, a plurality of pulleys adapted to support and drive said printing belt, means cooperating with the belt stylus responsive to signals received from the photoelectric device whereby a copy of the image scanned by the apertured belt is produced, and a shaft to which is secured a scanning-belt pulley and a printing-belt pulley, said two pulleys being of different diameters and the belt supported by the larger pulley being of proportionately greater length whereby the two belts are caused to move in synchronism although at different linear velocities.

15. In a facsimile apparatus, an endless scanning belt having an aperture therein, an endless printing belt having a stylus thereon, a separate series of pulleys supporting and adapted to drive each of said belts, and a shaft fixedly mounting a scanning belt pulley and a printing belt pulley, said two pulleys being of different diameters and the belt supported by the larger pulley being of proportionately greater length whereby the two belts are caused to move in synchronism although at different linear velocities.

16. A facsimile film-copying apparatus comprising a projector having means for moving an image-bearing film and an optical system for projecting the image in a focal plane, a viewing screen located in said plane, means interposed between the projector and the screen to intercept and deflect a transverse elemental area of the projected image into a second focal plane, and means adapted to scan the transverse elemental area in said second focal plane and to reproduce the scanned image in response to signals resulting from the scanning.

17. A facsimile film-copying apparatus comprising a projector having means for moving an image-bearing film and an optical system for projecting the image in a focal plane, a translucent screen located in said plane, optical means including a relatively narrow and elongated mirror interposed between the projector and the screen to intercept and deflect a transverse elemental area of the projected image into a second focal plane, and means adapted to scan the transverse elemental area in said second focal plane and to reproduce the scanned image in response to signals resulting from the scanning.

18. A facsimile film-copying apparatus comprising a projector having means for moving an image-bearing film and an optical system for projecting the image in a focal plane, a translucent screen located in said plane, optical means including a relatively narrow and elongated element interposed between the projector and the screen to intercept and deflect a transverse elemental area of the projected image into a second focal plane, an endless apertured belt, a plurality of pulleys adapted to support and drive said apertured belt to scan the transverse elemental area in said second focal plane, a photoelectric device adapted to receive that light from the transverse elemental area of the projected image which traverses the apertured belt, an endless printing belt having a stylus thereon, a plurality of pulleys adapted to support and drive said printing belt, and means cooperating with said stylus responsive to signals received from the photoelectric device whereby a copy of the image scanned by the apertured belt is produced.

19. A facsimile film-copying apparatus comprising a projector having means for moving an image-bearing film and an optical system for projecting the image in a focal plane, a translucent screen located in said plane, optical means including a relatively narrow and elongated element interposed between the projector and the screen to intercept and deflect a transverse elemental area of the projected image into a second focal plane, a plurality of pulleys, and belt means supported and driven by said pulleys and adapted to scan the transverse elemental area in said second focal plane and to reproduce the scanned image in response to signals resulting from the scanning.

References Cited in the file of this patent

UNITED STATES PATENTS

| | | |
|---|---|---|
| 1,768,893 | Deutsch | July 1, 1930 |
| 2,063,614 | McFarlane et al. | Dec. 8, 1936 |
| 2,110,945 | Walton | Mar. 15, 1938 |
| 2,140,233 | Knudsen | Dec. 13, 1938 |
| 2,251,828 | Hommard | Aug. 5, 1941 |
| 2,393,639 | Keinoth | Jan. 29, 1946 |
| 2,571,785 | Thompson | Oct. 16, 1951 |
| 2,575,742 | Baltin et al. | Nov. 20, 1951 |
| 2,578,307 | Hunt | Dec. 11, 1951 |